March 26, 1929.  J. T. PEARSON ET AL  1,706,811

COVER FOR CONDUIT OUTLET BOXES

Filed March 12, 1925

INVENTORS.
John T. Pearson and Raymond H. Olley.
BY
Parsons & Bodell.
ATTORNEYS.

Patented Mar. 26, 1929.

1,706,811

UNITED STATES PATENT OFFICE.

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK.

COVER FOR CONDUIT-OUTLET BOXES.

Application filed March 12, 1925. Serial No. 14,908.

This invention relates to covers for electric conduit outlet boxes of the type set forth in our Patent No. 1,525,689 issued February 10, 1925, and has for its object a particularly simple and efficient construction by which the cover with self contained fastening means must be set squarely on the opening of the box and cannot be inadvertently misplaced, also means for holding a gasket in position on the cover when the cover is displaced.

The invention consists in the novel features and in the combinations and constructions hereinafter set forth and claimed.

In describing this invention, reference is had to the accompanying drawings in which like characters designate corresponding parts in all the views.

Figure 1:
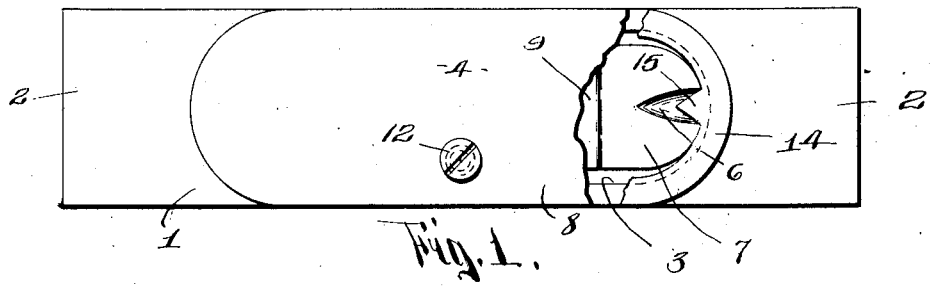
Figure 1 is a plan view, partly broken away, of a conduit outlet box provided with our invention.
Figure 2:
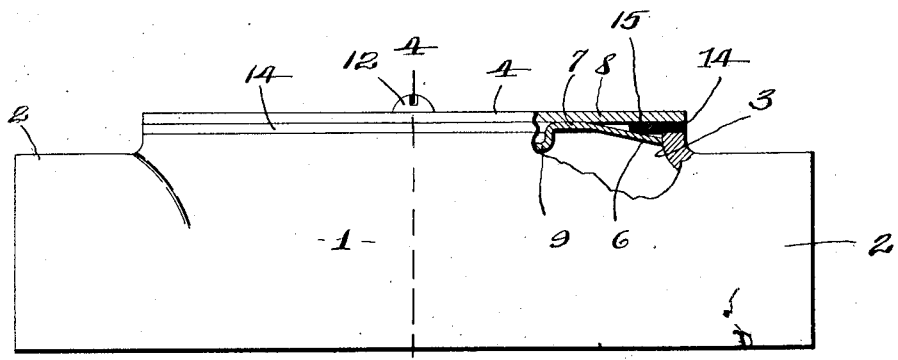
Figure 2 is a side elevation thereof with a portion thereof broken away.
Figure 3:
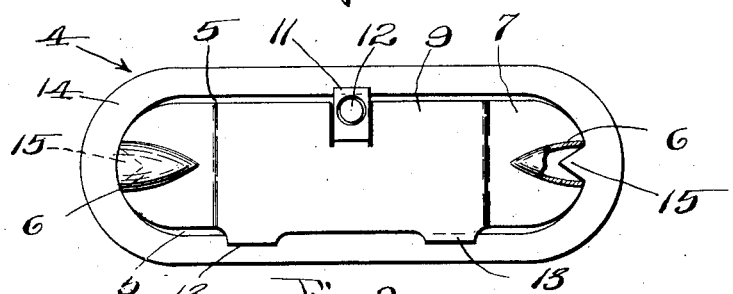
Figure 3 is an inner face view of the cover partly broken away.
Figure 4:
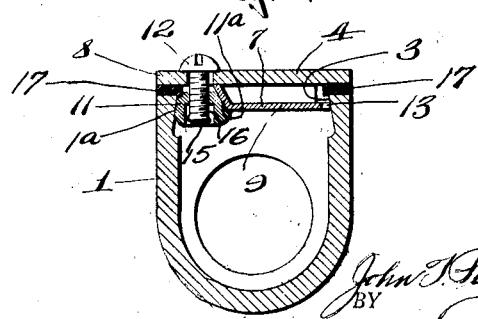
Figure 4 is a sectional view on line 4—4, Figure 3.

This invention comprises a cover for conduit outlet boxes provided with a marginal recess for receiving the edge of the walls of the box around the opening in the box, said cover being also provided with bosses near its ends having end faces substantially even with the inner wall of the marginal recess, means self contained with the cover and co-acting with the inner unobstructed wall of the box for attaching the cover to the box and a gasket lying in the recess and having means interlocking with the bosses to hold the gasket from displacement. The bosses are provided with abrupt faces presented toward the edge of the cover and with inclined faces extending toward the central part of the cover, these bosses preventing the workman from attaching the cover to the box unless the cover is squarely on the box.

1 designates the conduit outlet box which is shallow and elongated in general form and has one or more threaded nipples 2 for connection in an electric conduit system. The box is also formed with an elongated opening 3 extending lengthwise in one side, the opposite side walls of this opening presenting unobstructed inner faces, that is, they are unprovided with lugs or projections which interfere with the manipulation or the passage of the wires.

4 designates the cover, this being formed with a marginal recess 5 for receiving the edge of the wall of the box around the opening 3.

6 are bosses on the inner side of the cover near the ends thereof, these bosses having their ends in line with the inner wall of the recess and said bosses extending lengthwise of the cover for a sufficient distance to prevent the cover from being placed flatwise on the box unless the cover is squarely fitted to the opening 3 of the box. As here illustrated, these bosses 6 are lengthwise corrugations formed in the end portion of a plate 7 secured to the inner face of an outer plate 8 forming the major part of the cover, the plate 7 having its intermediate portion 9 offset or spaced apart from the plate 8. The end portions of the plate 7 are secured to the plate 8 in any suitable manner, usually by spot welding, and the bosses 6 are lengthwise corrugations in the end portions of the plate 7. These corrugations are formed so that they taper or incline from their outer ends toward their inner ends thus presenting an abrupt face toward the edge of the cover and inclined faces toward the central part of the cover.

The means for attaching the cover to the box is self contained with the cover and hence would act to attach the cover to the box if the cover were not squarely placed on the box and if means as the bosses 6 for requiring the cover to be placed squarely on the box were not provided. As here illustrated, this fastening means consists of a nut or wedge 11 located at one edge of the offset portion 9 of the plate 7 of the cover, the nut and the intermediate portion of the plate being formed with coacting inclined plane faces at 11$^a$, a screw 12 extending through the cover and threading into the nut and a pair of shoulders 13 on the opposite edge of the offset portion of the inner plate 7 of the cover for thrusting against the opposite wall of the box from that with which the nut or wedge coacts. The nut or wedge 11 is formed with a slightly beveled face 1$^a$ at its outer side for coacting with a complemental bevel face as in the Patent No. 1,525,689.

In addition, the nut or wedge is provided with an inwardly and downwardly beveled face at its lower outer corner or a face beveled opposite to the beveled face that engages the box wall, such beveled face causing the wedge to have a ratcheting action into engagement with the box wall when the cover is being placed on the box and while the screw 12 is untightened. The hole in the cover for the screw is slightly elongated to permit lateral movement of the screw with the nut or wedge. Also the screw is formed with a head 15 at its inner end to prevent complete separation of the screw and the nut, and the nut is formed with an enlarged recess 16 in line with the threaded bore of the nut to receive and house the inner end of the screw so that the screw does not project beyond the nut and form an obstruction on which the insulation of the wires in the box may cut.

Obviously, when the cover is placed on the box and the screw turned, the nut or wedge will be shifted laterally into wedging engagement with one side wall of the box and thrust the shoulders into engagement with the other side wall of the box.

17 designates the gasket lying in the recess 5 and having means for interlocking with the bosses 6, this means being here shown as tongues or lugs 15 extending into the corrugations or bosses 6.

Owing to this construction, it is not possible for a careless workman to attach the cover to the box unless the cover is squarely on the box and entirely covers the opening of the box or to attach the cover to the box without the gasket as the gasket is interlocked with the cover so that it can not become unintentionally dislodged therefrom.

What we claim is:

1. The combination with an electric conduit outlet box having an opening in one side, the side walls of the box presenting unobstructed inner faces, of a cover provided with a marginal recess for receiving the edge of the box around the opening, said cover being also provided with bosses at its ends in line with the inner wall of the recess, means self contained with the cover and coacting with the inner unobstructed faces of the walls of the box for attaching the cover to the box and a gasket lying in the recess and having means interlocking with the bosses to hold the gasket from displacement.

2. The combination with an electric conduit outlet box having an opening in one side, the side walls of the box presenting unobstructed inner faces, of a cover provided with a marginal recess for receiving the edge of the box around the opening, said cover being also provided with bosses at its ends, means self contained with the cover and coacting with the inner unobstructed faces of the walls of the box for attaching the cover to the box, the bosses having abrupt faces presented toward the edge of the cover and in line with the inner wall of the recess and inclined faces extending toward the central part of the cover whereby the cover is caused to be set squarely on the open side of the box.

3. The combination with an electric conduit outlet box having an opening in one side, the side walls of the box presenting unobstructed inner faces, of a cover provided with a marginal recess for receiving the edge of the box around the opening, said cover being also provided with bosses at its ends, means self contained with the cover and coacting with the inner unobstructed faces of the walls of the box for attaching the cover to the box, the bosses having abrupt faces presented toward the edge of the cover and in line with the inner wall of the recess and openings in such faces and a gasket lying in the recess and having lugs extending into the openings of said projections.

4. The combination with an electric conduit outlet box having an opening in one side, the side walls of the box presenting unobstructed inner faces, of a cover provided with a marginal recess for receiving the edge of the box around the opening, said cover being also provided with bosses at its ends means self contained with the cover and coacting with the inner unobstructed faces of the walls of the box for attaching the cover to the box, the bosses having abrupt faces presented toward the edge of the cover and opening in such faces and inclined faces extending toward the central part of the cover and also having a gasket lying in the recess and having lugs extending into the openings of the bosses.

5. A cover for conduit outlet boxes having an elongated opening in one side and its side walls around the opening presenting unobstructed inner faces; of an elongated cover for the opening comprising a plate arranged to lap the edges of the walls of the box around the opening, a second plate on the inner face of the first plate and being of less width and length than the first plate providing a marginal recess around the cover, means associated with the cover for coacting with the inner unobstructed faces of the walls of the box for attaching the cover to the box, the inner plate being provided with bosses at its ends, said bosses terminating at the ends of the inner plate and a gasket lying in the recess and having lugs extending under said bosses.

6. A cover for conduit outlet boxes having an oblong narrow opening in one side and the side walls of the box around the opening presenting unobstructed inner faces, the cover comprising a plate arranged to lap the edge of the wall around the opening, a second plate having end portions overlying the inner face of the former plate and its intermediate part offset from the former plate, the second plate being of less dimension than the first plate providing a marginal recess around the inner face of the cover, the end portions of the second plate being formed with lengthwise corrugations, the ends of which are in line with the end of the second plate, the outer surfaces of the corrugation inclining lengthwise of the corrugation toward the second plate, means associated with the offset portion of the second plate and coacting with the inner unobstructed faces of the walls of the box for attaching the cover to the box and a gasket lying in said recess and having lugs extending into the ends of the corrugations.

In testimony whereof, we have hereunto signed our names, at Syracuse, in the county of Onondaga and State of New York, this 28th day of February, 1925.

JOHN T. PEARSON.
RAYMOND H. OLLEY.